United States Patent
Yang et al.

(10) Patent No.: US 7,622,827 B2
(45) Date of Patent: *Nov. 24, 2009

(54) SWITCHING CONTROLLER FOR PARALLEL POWER SUPPLY

(75) Inventors: Ta-Yung Yang, Taipei (TW); Yu-Min Chen, Taipei (TW); Chih-Ho Lin, Taipei (TW)

(73) Assignee: System General Corporation, Taipei (TW)

( * ) Notice: Subject to any disclaimer, the term of this patent is extended or adjusted under 35 U.S.C. 154(b) by 242 days.

This patent is subject to a terminal disclaimer.

(21) Appl. No.: 11/675,968

(22) Filed: Feb. 16, 2007

(65) Prior Publication Data

US 2008/0198636 A1    Aug. 21, 2008

(51) Int. Cl.
*H02M 11/00* (2006.01)
(52) U.S. Cl. .................................................. 307/112
(58) Field of Classification Search .................. None
See application file for complete search history.

(56) References Cited

U.S. PATENT DOCUMENTS

| | | | |
|---|---|---|---|
| 6,246,222 B1 * | 6/2001 | Nilles et al. | 323/283 |
| 6,262,566 B1 | 7/2001 | Dinh | |
| 6,278,263 B1 | 8/2001 | Walters et al. | |
| 6,362,608 B1 | 3/2002 | Ashburn et al. | |
| 6,404,175 B1 | 6/2002 | Yang et al. | |
| 6,459,602 B1 * | 10/2002 | Lipcsei | 363/132 |
| 6,903,537 B2 * | 6/2005 | Tzeng et al. | 323/268 |
| 7,265,522 B2 * | 9/2007 | Sutardja et al. | 323/222 |
| 7,301,314 B2 * | 11/2007 | Schuellein et al. | 323/272 |
| 2007/0263617 A1 * | 11/2007 | Takemura | 370/360 |
| 2008/0100277 A1 * | 5/2008 | Yang | 323/318 |
| 2008/0225560 A1 * | 9/2008 | Yang et al. | 363/71 |

* cited by examiner

*Primary Examiner*—Stephen W Jackson
*Assistant Examiner*—Adi Amrany (57) ABSTRACT

A switching controller for a parallel power supply is disclosed. The switching controller includes an input circuit coupled to an input terminal to receive an input signal for generating a phase-shift signal, a first integration circuit coupled to the input circuit to generate a first integration signal in response to a pulse width of the input signal, and a control circuit coupled to the first integration circuit to generate a switching signal for switching the power supply, the switching signal being enabled in response to the phase-shift signal, a pulse width of the switching signal being determined in accordance with the first integration signal.

8 Claims, 9 Drawing Sheets

FIG. 16

SWITCHING CONTROLLER FOR PARALLEL POWER SUPPLY

BACKGROUND OF THE INVENTION

1. Field of the Invention

The present invention relates to switching controllers, and more particularly to a switching controller of power supply.

2. Description of the Related Art

In order to fulfill the high-speed need for computer and communication systems, a power supply is required to deliver more current to CPU and its peripherals. However, such a high current demand increases power losses in the power supply. The power loss of the power supply is proportional to the square of its switching current.

$$P_{LOSS} = I^2 \times R \qquad (1)$$

where I is the switching current of the power supply, and R is the impedance of the switching devices such as the resistance of the inductor and the transistor, or the like.

Higher output current results in lower efficiency and the efficiency is more adversely affected for the power supply with low output voltage. In recent development, parallel-output technologies have been developed to solve this problem. Examples are, for instance, "DC-to-DC controller having a multi-phase synchronous buck regulator" U.S. Pat. No. 6,262,566 to Dinh; "Multi-phase converter with balanced currents" by Walters et al., U.S. Pat. No. 6,278,263; "Multi-phase switching converters and methods" by Ashburn et al., U.S. Pat. No. 6,362,608; and "Multi-phase and multi-module power supplies with balanced current between phases and modules" by Yang et al., U.S. Pat. No. 6,404,175. However, there exists one problem in these prior arts, that is, the limited parallel channels. Typically, mere two or three channels are developed in terms of the disclosures of the prior art. The limited parallel channels cause inflexibility of the application of the parallel-output technologies. Another disadvantage is the balance current approach that requires the measurement of the switching current. The switching current measurement normally causes power losses.

SUMMARY OF THE INVENTION

An objective of the present invention is to provide a switching controller with power sharing capability for a power supply that requires no current measurement and enhances flexibility of application of parallel channels.

In order to achieve the above and other objectives, the switching controller for a power supply according to the present invention comprises an input circuit for receiving an input signal for generating a phase-shift signal, a resistor for determining a delay time in between the input signal and the phase-shift signal, a first integration circuit coupled to the input circuit to generate a first integration signal in response to a pulse width of the input signal, and a control circuit for generating the switching signal for switching the power supply. The switching controller for a power supply further comprises a second integration circuit for generating a second integration signal in response to a pulse width of a switching signal.

The switching signal is enabled in response to the enabling of the phase-shift signal and is disabled in response to the comparison of the first integration signal and the second integration signal. The time constant of the first integration circuit is correlated with the time constant of the second integration circuit. Therefore, the pulse width of the switching signal is determined in accordance with the level of the first integration signal. The level of the first integration signal is increased in response to the increase of pulse width of the input signal, while the pulse width of the switching signal is decreased in response to the decrease of the first integration signal. The pulse width of the switching signal will thus follow the pulse width of the input signal to achieve the power sharing. Furthermore, a detection circuit is provided to detect the input signal, allowing the switching signal to be enabled in response to a pulse signal, if the input signal were detected by the detection circuit to be not available. An oscillator is further provided to generate the pulse signal and a ramp signal, and an error amplifier is coupled to the output of the power supply to generate an error signal. It allows the switching signal is disabled in response to the comparison of the error signal and the ramp signal. If the input signal is available, the error amplifier will be operated for over-voltage protection.

The switching controller with power sharing capability of the present invention can be stand-alone or parallel operation to provide high output current for power supply. The number for the parallel arrangement of the switching controller has no limit theoretically. Synchronization and phase shift can be further utilized to spread switching noise and reduce ripple. As power sharing is used instead of the balance current, no current measurement is needed, which simplifies the circuit and further improves the efficiency of power supply.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
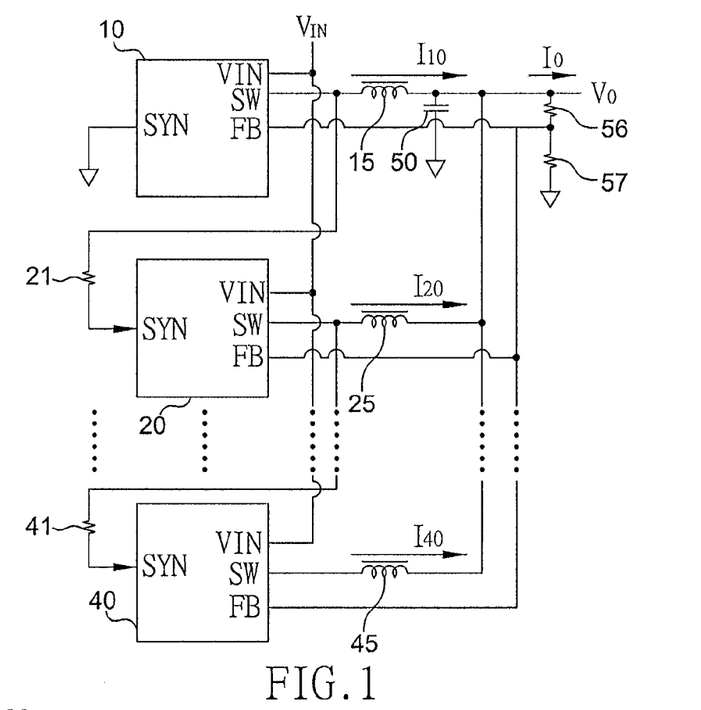
FIG. 1 shows a circuit diagram that depicts parallel power supplies of a first embodiment according to present invention.

FIG. 1 shows parallel power supplies of a first embodiment according to present invention. The parallel power supplies comprise a plurality of cascaded power converters, e.g. a first power Converter developed by a switching controller 10 and an inductor 15, a second power converter formed by a switching controller 20 and an inductor 25 and a fourth power converter developed by a switching controller 40 and an inductor 45 A capacitor 50 is connected to an output voltage $V_O$ of the parallel power supplies. A source terminal VIN of the switching controller 10 is connected to an input voltage $V_{IN}$. When the switching controller 10 is on, a switching current $I_{10}$ is generated and is given by, $$I_{10} = \frac{V_{IN} - V_O}{L_{15}} \times T_{ON\text{-}10} \qquad (2)$$

where the $L_{15}$ is the inductance of the inductor 15 that smoothes out a ripple current for switching current to reduce the ripple current; $T_{ON\text{-}10}$ is the on-time of the switching controller 10; $V_{IN}$ is the input voltage; and $V_O$ is the output voltage.

The feedback terminal FB of the switching controller 10 is coupled to the output voltage $V_O$ through resistors 56 and 57 forming a voltage divider to regulate the output voltage $V_O$ of the power supply. The output terminal SW of the switching controller 10 is coupled to the input terminal SYN of the switching controller 20 through a resistor 21. The switching controller 40 is controlled by its previous switching controller through a resistor 41. The switching controller 10 is operated as a master controller, while the switching controllers 20 and 40 are activated as slave controllers. The output of power converters is connected to the output voltage $V_O$. Slave controllers can be connected as a daisy chain for the synchronization and power sharing. The on-time and the switching period of slave controllers will follow the on-time and the switching period of the master controller. The delay time in between switching signals of switching controllers are determined by resistors such as resistors 21 and 41, etc.

If the power converter is operated at the continuous current mode (CCM), its switching current will include a DC current and the ripple current. The output voltage $V_O$ and the output current $I_O$ of the power supply can be expressed as, $$V_O = V_{IN} \times \frac{T_{ON}}{T} \qquad (3)$$

$$I_{10} = I_{A-10} + \left(\frac{V_{IN} - V_O}{2 \times L_{15}} \times T_{ON-10}\right) \qquad (4)$$

$$I_{20} = I_{A-20} + \left(\frac{V_{IN} - V_O}{2 \times L_{25}} \times T_{ON-20}\right) \qquad (5)$$

$$I_{40} = I_{A-40} + \left(\frac{V_{IN} - V_O}{2 \times L_{45}} \times T_{ON-40}\right) \qquad (6)$$

$$I_O = I_{10} + I_{20} + \ldots + I_{40} \qquad (7)$$

where $L_{25}$ and $L_{45}$ is the inductance of the inductor 25 and 45 respectively; $T_{ON\text{-}20}$ and $T_{ON\text{-}40}$ are the on-time of the switching controller 20 and 40 correspondingly; $I_{A\text{-}10}$ is the DC current of the first power converter, $I_{A\text{-}20}$ is the DC current of the second power converter; $I_{A\text{-}40}$ is the DC current of the fourth power converter.

Because the on-time and the switching period of the slave controllers are designed equal to the on-time $T_{ON}$ and the switching period T of the master controller, the output current of each power converter will be same if the inductance of inductors is similar.

Figure 2:
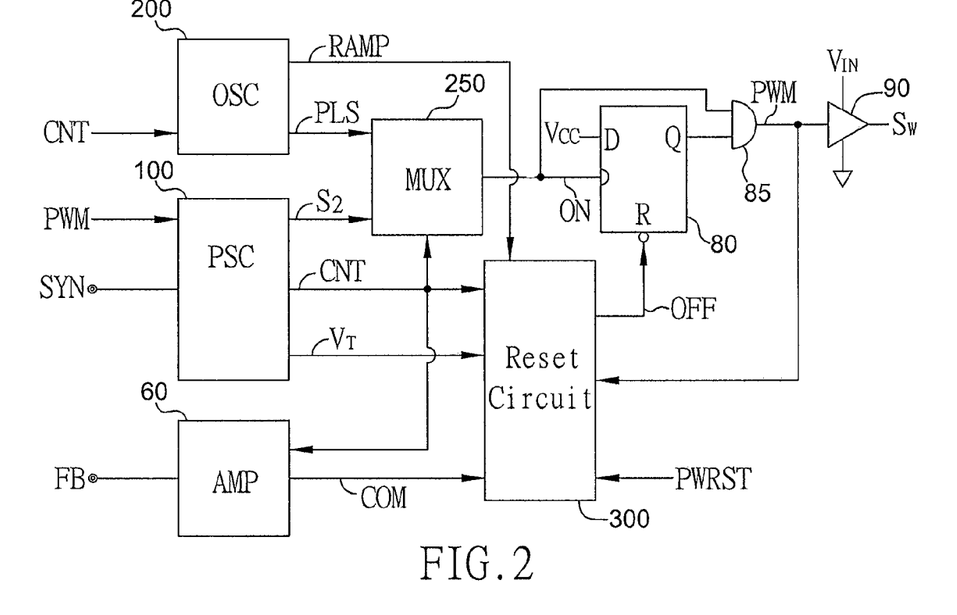
FIG. 2 shows a switching controller of the parallel power supplies shown in FIG. 1.

FIG. 2 shows a preferred embodiment of the switching controller according to the present invention. The switching controller includes a power-sharing circuit (PSC) 100 connected to the input terminal SYN for receiving the input signal $S_{YN}$, allowing the input signal $S_{YN}$ to be the output signal of another switching controller. The power-sharing circuit (PSC) 100 is used to generate a phase-shift signal $S_2$, a control signal CNT and a first integration signal $V_T$ in response to the input signal $S_{YN}$. The phase-shift signal $S_2$ is generated after a delay time $T_{DLY}$ when the input signal $S_{YN}$ is enabled. The control signal CNT indicates the availability of the input signal $S_{YN}$. The first integration signal $V_T$ is produced in accordance with the pulse width of the input signal $S_{YN}$.

An oscillator 200 is utilized to generate a pulse signal PLS and a ramp signal RAMP. The pulse signal PLS and the phase-shift signal $S_2$ are connected to a multiplexer 250. The control signal CNT is connected to control the multiplexer 250. The multiplexer 250 outputs the phase-shift signal $S_2$ when the control signal CNT is enabled. The is multiplexer 250 will output the pulse signal PLS if the control signal CNT is disabled. The output signal ON of the multiplexer 250 is coupled to set a flip-flip 80. The flip-flop 80 and an AND gate 85 form a control circuit to generate a switching signal PWM at the output of the AND gate 85. Inputs of the AND gate 85 are connected to the output of the flip-flop 80 and the output of the multiplexer 250. The flip-flop 80 is reset by a reset signal OFF. A reset circuit 300 is developed to generate the reset signal OFF in response to the first integration signal $V_T$ or an error signal COM. When the control signal CNT is disabled, the reset signal OFF is generated in response to the error signal COM. The error signal COM compares with the ramp signal RAMP to generate the reset signal OFF. The control signal CNT is disabled when the switching controller is operated as the master controller. If the switching controller is operated as the slave controller, the control signal CNT will be enabled and the reset signal OFF will be generated in response to the first integration signal $V_T$.

An error amplifier 60 is coupled to the feedback terminal FB to generate the error signal COM in accordance with the output voltage $V_O$ of the power supply. The error amplifier 60 is operated for over-voltage protection if the control signal CNT is enabled. The switching signal PWM is coupled to control a drive circuit 90 for switching the power converter. The output of the drive circuit 90 is the output SW of the switching controller.

Figure 3:
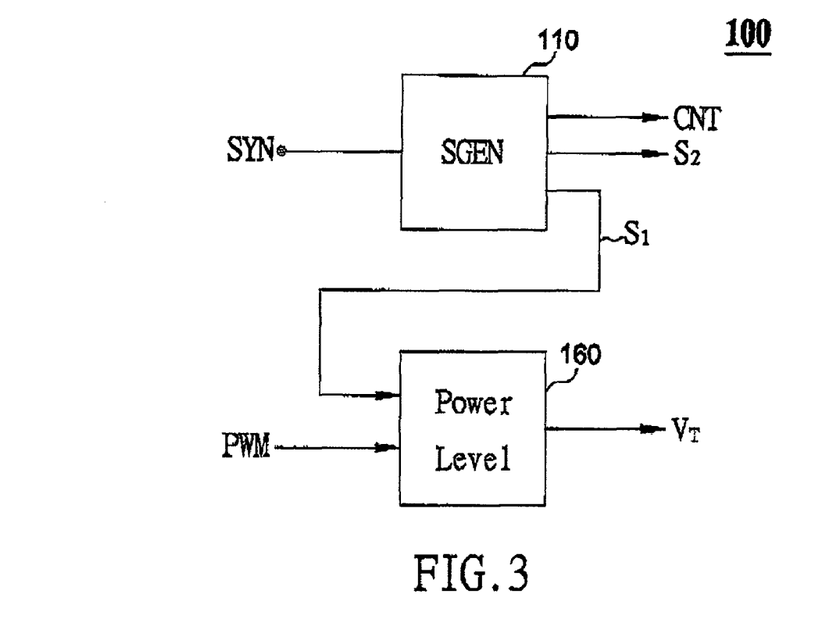
FIG. 3 shows a power sharing circuit of the switching controller shown in FIG. 2.

FIG. 3 shows the power sharing circuit 100. It includes an input circuit 110 and a first integration circuit 160. The input circuit 110 is is coupled to the input terminal SYN to receive the input signal $S_{YN}$ for generating the control signal CNT, the phase-shift signal $S_2$ and an input-shaping signal $S_1$. The input-shaping signal $S_1$ is connected to the first integration circuit 160. The first integration circuit 160 generates the first integration signal $V_T$ in response to the input-shaping signal $S_1$ and the switching signal PWM.

Figure 4:
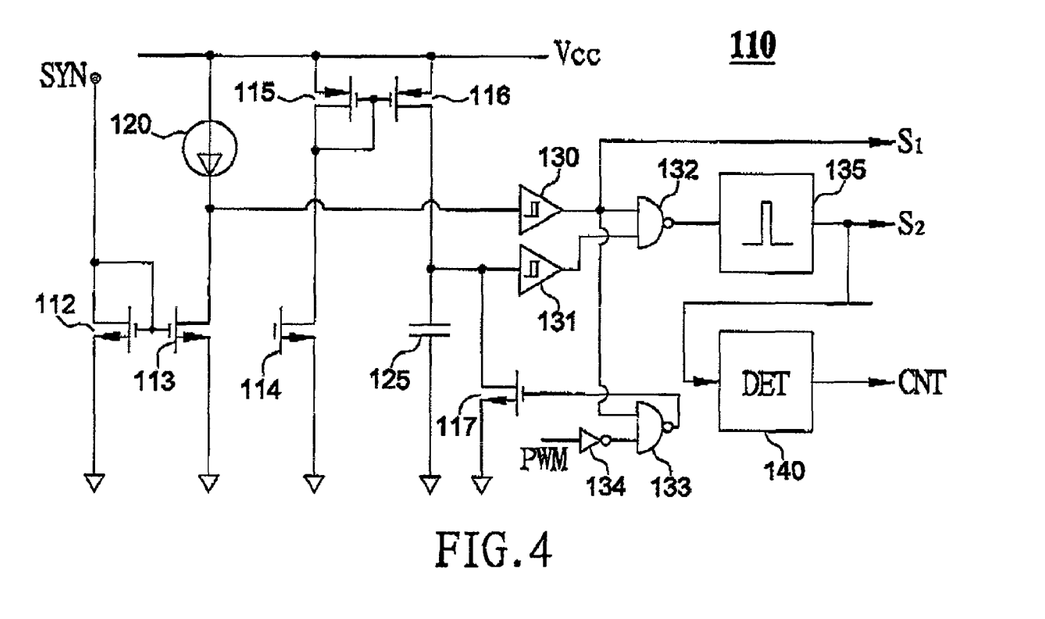
FIG. 4 is an input circuit of the switching controller shown in FIG. 2.

FIG. 4 is a preferred embodiment of the input circuit 110. Transistors 112, 113 and 114 form a current mirror connected to the input terminal SYN to receive the input signal $S_{YN}$. The input signal $S_{IN}$ generates an input current $I_{112}$ to the transistor 112. Transistors 113 and 114 produce currents $I_{113}$ and $I_{114}$ respectively in accordance with the input current $I_{112}$. A current source 120 generates a current $I_{120}$ coupled to the transistor 113 to compare with the current $I_{113}$. An inverter 130 having an input is connected to the join of the current source 120 and the transistor 113. The inverter 130 is used to generate the input-shaping signal $S_1$ in response to the comparison of currents $I_{120}$ and $I_{113}$. The input-shaping signal $S_1$ will be enabled (logic-high) when the current $I_{113}$ is higher than the current $I_{120}$. Transistors 115 and 116 form another current mirror to generate a current $I_{116}$ in accordance with the current $I_{114}$. The current $I_{116}$ is connected to charge a capacitor 125. The input of an inverter 131 is connected to the capacitor 125. The output of the inverter 131 is connected to an input of an NAND gate 132. Another input of the NAND gate 132 is connected to the input-shaping signal $S_1$. The output of the NAND gate 132 is coupled to generate the phase-shift signal $S_2$ through a pulse generator 135. The delay time $T_{DLY}$ is existed in between the enable of the input signal $S_{IN}$ and the enable of the phase-shift signal $S_2$. The resistor such as resistor 21 or 41 determines the input current $I_{112}$. The input current $I_{112}$ and the capacitance of the capacitor 125 determine the delay time $T_{DLY}$.

A transistor 117 is connected to the capacitor 125 to discharge the capacitor 125. An NAND gate 133 is applied to control the on/off of the transistor 117. The first input of the NAND gate 133 is the input-shaping signal $S_1$. The second input of the NAND gate 133 is connected to the switching signal PWM via an inverter 134. Therefore, the capacitor 125 is discharged once the input-shaping signal $S_1$ is disabled or the switching signal PWM is enabled. Furthermore, a detection circuit 140 is utilized to detect the input of the input signal $S_{IN}$. The detection circuit 140 will generate the control signal CNT in response to the phase-shift signal $S_2$.

Figure 5:
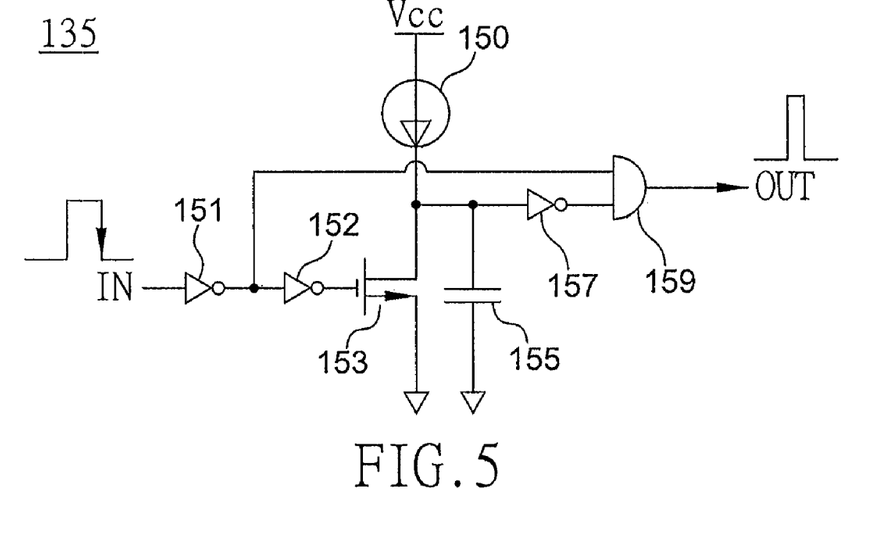
FIG. 5 shows a pulse generator of the switching controller shown in FIG. 2.

FIG. 5 shows the circuit schematic of the pulse generator 135. An inverter 151 is connected to the input of the pulse generator 135 to receive an input signal. The output of the inverter 151 is coupled to control a transistor 153 through an inverter 152. A capacitor 155 is parallel connected with the transistor 153. A current source 150 is coupled to charge the capacitor 155. An inverter 157 is connected to the capacitor 155. The output of the inverter 157 is connected to an input of an AND gate 159. Another input of the AND gate 159 is connected to the output of the inverter 151. The output of the AND gate 159 is connected to the output of the pulse generator 135. Therefore, the pulse generator 135 generates a pulse voltage in response to the falling edge of the input signal of the pulse generator 135. The current of the current source 150 and the capacitance of the capacitor 155 determine the pulse width of the pulse voltage.

Figure 6:
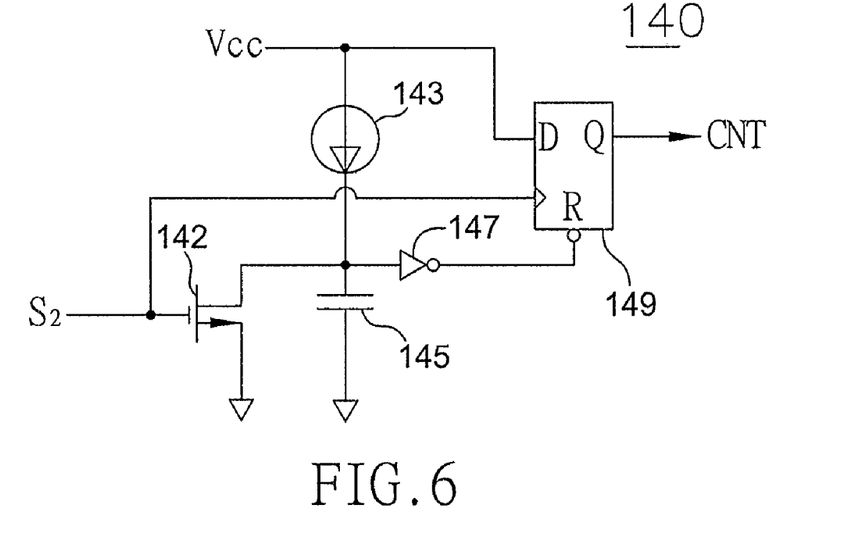
FIG. 6 is a detection circuit of the switching controller shown in FIG. 2, for detecting the input of the input signal.

FIG. 6 is the detection circuit 140. The phase-shift signal $S_2$ is coupled to control a transistor 142. The transistor 142 is used to discharge a capacitor 145. A current source 143 is connected to charge the capacitor 145. The input of an inverter 147 is connected to the capacitor 145. The output of the inverter 147 is connected to reset a flip-flop 149. The flip-flop 149 is enabled by the phase-shift signal $S_2$. The flip-flop 149 is used to generate the control signal CNT in response to the phase-shift signal $S_2$. If the phase-shift signal $S_2$ is not inputted within a time-out period, the control signal CNT will be disabled. The current of the current source 143 and the capacitance of the capacitor 145 determine the time-out period.

Figure 7:
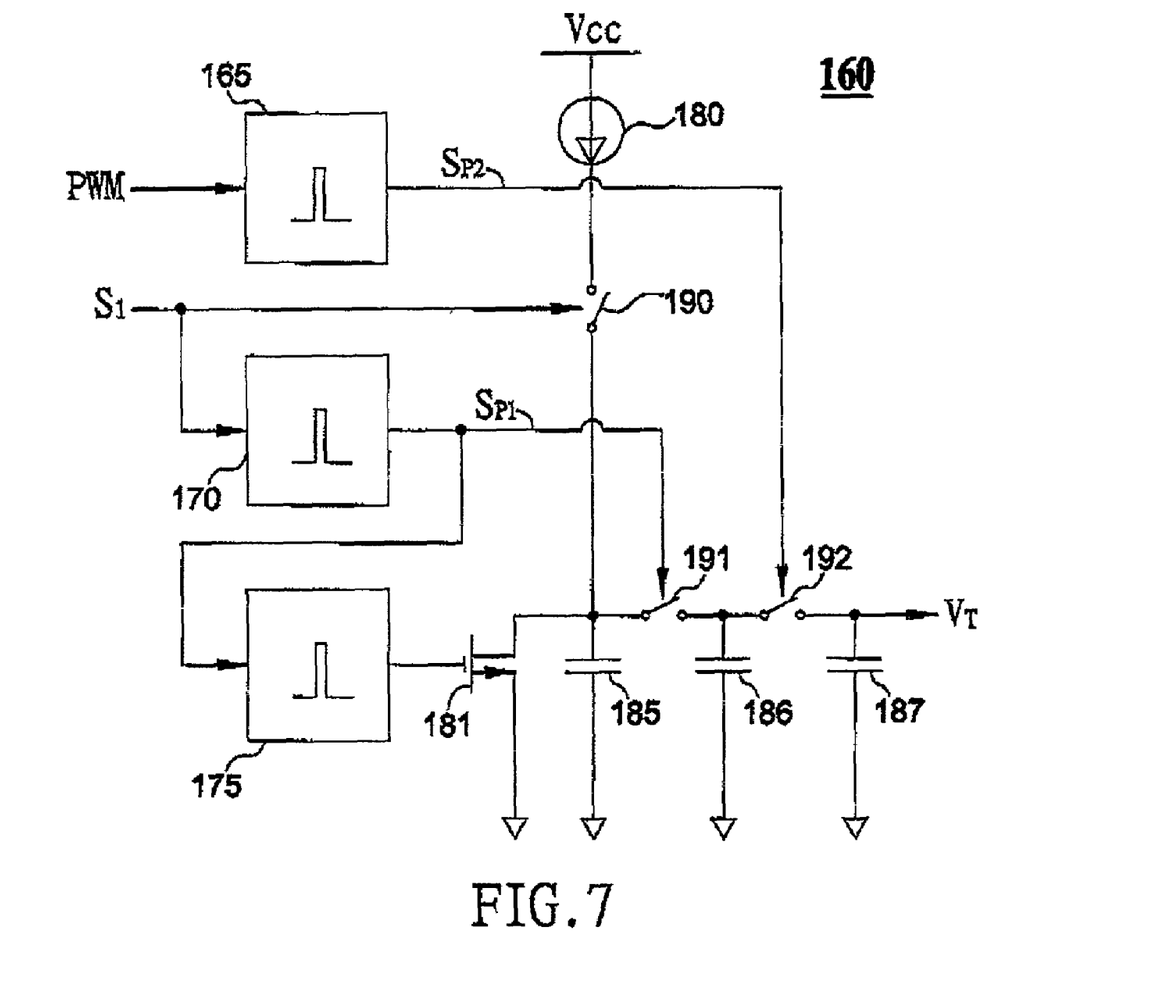
FIG. 7 shows a first integration circuit of the switching controller shown in FIG. 2.

FIG. 7 shows a preferred embodiment of the first integration circuit 160. A current source 180 is connected to charge a capacitor 185 through a switch 190. The switch 190 is controlled by the input-shaping signal $S_1$. A capacitor 186 is coupled to the capacitor 185 via a switch 191. The switch 191 is controlled by a first-sample signal $S_{P1}$. A capacitor 187 is coupled to the capacitor 186 through a switch 192 to generate the first integration signal $V_T$. The switch 192 is controlled by a second-sample signal $S_{P2}$. The second-sample signal $S_{P2}$ is generated by the switching signal PWM through a pulse generator 165. A pulse generator 170 is used to generate the first-sample signal $S_{P1}$ in response to the input-shaping signal $S_1$. A transistor 181 is connected to discharge the capacitor 185 in response to the end of the first-sample signal $S_{P1}$. The first-sample signal $S_{P1}$ is coupled to control the transistor 181 through a pulse generator 175. Therefore, the pulse width $T_{ON1}$ of the input signal $S_{IN}$, the current $I_{180}$ of the current source 180 and the capacitance $C_{185}$ of the capacitor 185 determine the level of the first integration signal $V_T$.

$$V_T = \frac{I_{180}}{C_{185}} \times T_{ON1} \qquad (8)$$

Figure 8:
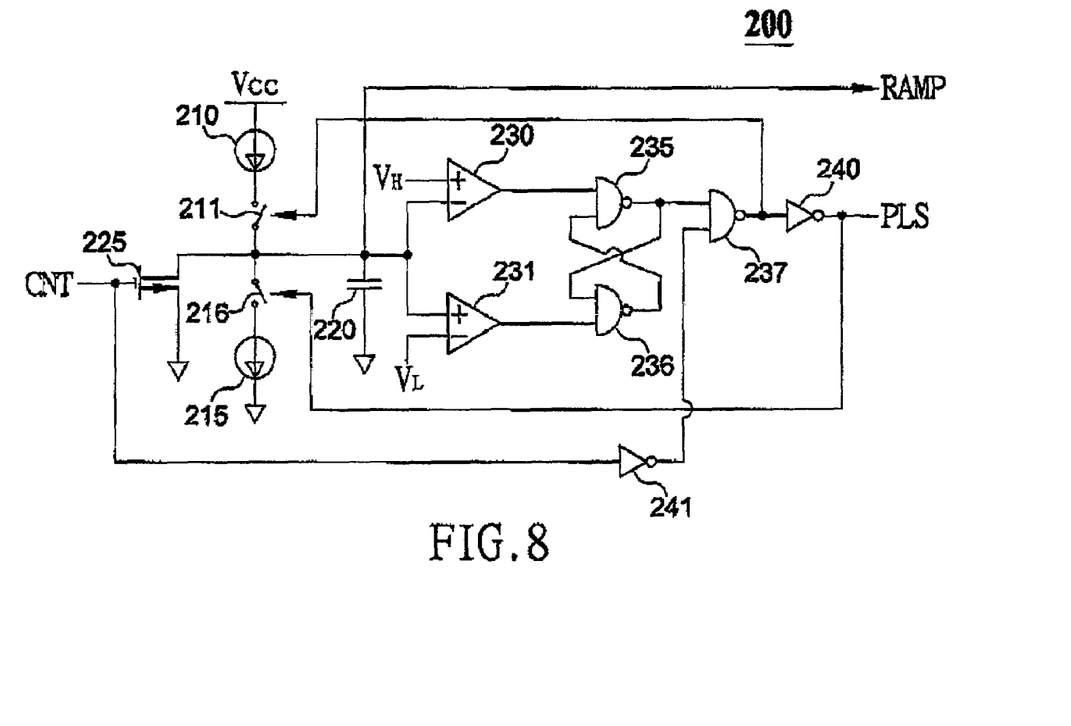
FIG. 8 shows an oscillation circuit of the switching controller shown in FIG. 2.

FIG. 8 shows the circuit schematic of the oscillator 200. A current source 210 is coupled to charge a capacitor 220 via a switch 211. A current source 215 is coupled to discharge the capacitor 220 via a switch 216. A comparator 230 includes a trip-point voltage $V_H$. A comparator 231 includes a trip-point voltage $V_L$. Comparators 230 and 231 are coupled to detect the voltage of the capacitor 220, NAND gates 235 and 236 form a latch circuit. The output of the comparator 230 and the output of the comparator 231 are connected to the latch circuit. The output of the latch circuit is connected to the input of an NAND gate 237. The output of the NAND gate 237 is connected to an inverter 240, which generates the pulse signal PLS. The pulse signal PLS is further coupled to control the on/off of the switch 216. The output of the NAND gate 237 is used to control the switch 211. The control signal CNT is utilized to discharge the capacitor 220 through a transistor 225 once the control signal CNT is enabled. The control signal CNT is further connected to disable the pulse signal PLS through an inverter 241 and the NAND gate 237.

Figure 9:
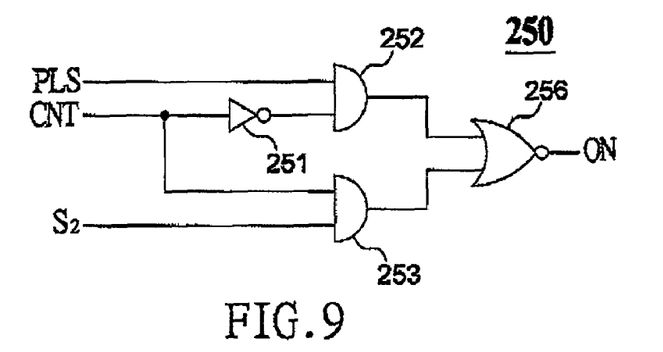
FIG. 9 shows a multiplexer of the switching controller shown in FIG. 2.

FIG. 9 shows the circuit schematic of the multiplexer 250. An AND gate 252 is connected to receive the pulse signal PLS. An AND gate 253 is connected to receive the phase-shift signal $S_2$. The control signal CNT is connected to AND gate 253. The control signal CNT is further connected to the AND gate 252 via an inverter 251. An NOR gate 256 is used to generate the output signal ON of the multiplexer 250 in response to the output of AND gates 252 and 253.

Figure 10:
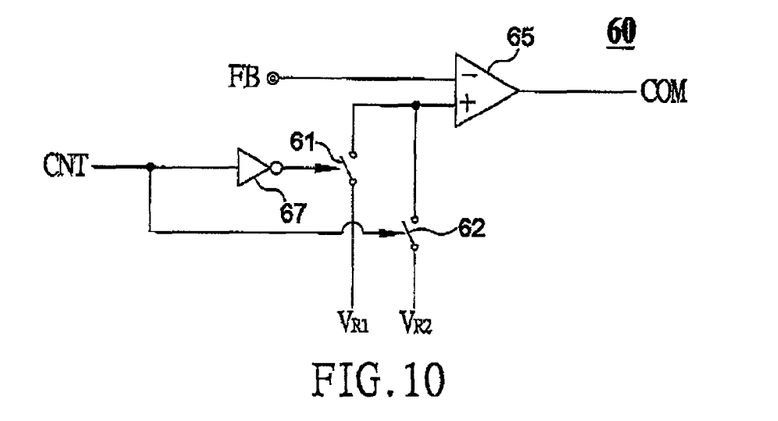
FIG. 10 is an error amplifier of the switching controller shown in FIG. 2.

FIG. 10 shows the circuit schematic of the error amplifier 60. It includes an operational amplifier 65 connected to the feedback terminal FB. Through a switch 61 or another switch 62, the positive input of the operational amplifier 65 is coupled to a reference voltage $V_{R1}$ or another reference voltage $V_{R2}$. The voltage of the reference voltage $V_{R2}$ is higher than the voltage of the reference voltage $V_{R1}$. The control signal CNT is used to control the switch 62. The control signal CNT is also coupled to control the switch 61 via an inverter 67. Therefore, the reference voltage $V_{R1}$ is coupled to the operational amplifier 65 for the feedback control when the control signal CNT is disabled. Meanwhile the operational amplifier 65 will generate the error signal COM in accordance with the output voltage $V_O$ of the power supply. Once the control signal CNT is enabled, the switching signal PWM is generated in response to the input signal $S_{IN}$. The reference voltage $V_{R2}$ is coupled to the operational amplifier 65. The error amplifier 60 is operated as comparator for over-voltage protection. The switching signal PWM will be disabled if the output voltage $V_O$ of the power supply is higher than an over-voltage threshold. The reference voltage $V_{R2}$ determines the over-voltage threshold.

Figure 11:
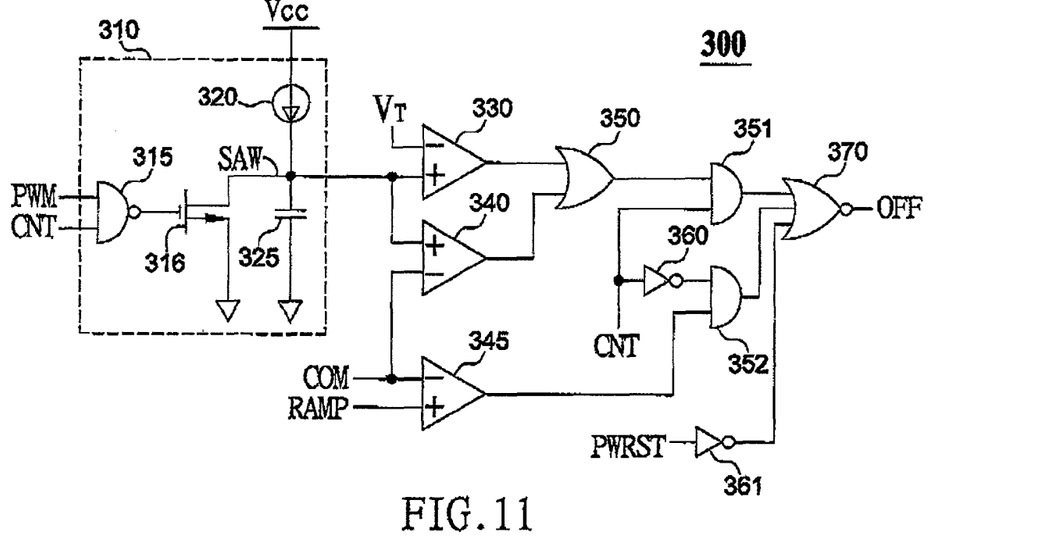
FIG. 11 shows a reset circuit of the switching controller shown in FIG. 2.

FIG. 11 shows a preferred embodiment of the reset circuit 300. The reset circuit 300 includes a second integration circuit 310, comparators 330, 340, 345, an OR gate 350, an NOR gate 370, AND gates 351, 352 and inverters 360, 361. The second integration circuit 310 contains a current source 320, a capacitor 325, a transistor 316 and an NAND gate 315. The switching signal PWM and the control signal CNT are connected to NAND gate 315. The output of NAND gate 315 is coupled to discharge the capacitor 325 through the transistor 316. The current source 320 is coupled to charge the capacitor 325 once the switching signal PWM and the control signal CNT are enabled. A second integration signal SAW is generated in response to the enabled of the switching signal PWM. The second integration signal SAW is connected to the comparator 330 to compare with the first integration signal $V_T$. The output of the comparator 330 is coupled to generate the reset signal OFF through the OR gate 350, the AND gate 351 and the NOR gate 370. Therefore, the switching signal PWM will be disabled once the second integration signal SAW is higher than the first integration signal $V_T$. The pulse width $T_{ON2}$ of the switching signal PWM can be expressed as, $$T_{ON2} = \frac{C_{325}}{I_{320}} \times V_T \qquad (9)$$

where the $C_{325}$ is the capacitance of the capacitor 325; $I_{320}$ is the current of the current source 320.

Refer to equation 8, the equation 9 can be written as, $$T_{ON2} = \frac{C_{325}}{I_{320}} \times \frac{I_{180}}{C_{185}} \times T_{ON1} \qquad (10)$$

Select the capacitance $C_{325}$ correlated to the capacitance $C_{185}$. Set the current $I_{320}$ correlated to the current $I_{180}$. The pulse width $T_{ON2}$ of the switching signal PWM will be same as the pulse width $T_{ON1}$ of the input signal $S_{YN}$. Therefore, the first integration signal $V_T$ is increased in response to the increase of pulse width $T_{ON1}$ of the input signal $S_{YN}$. The pulse width $T_{ON2}$ of the switching signal PWM is decreased in response to the decrease of the first integration signal $V_T$.

The second integration signal SAW is further connected to the comparator 340 to compare with the error signal COM for over-voltage protection. The error signal COM will become a logic-low signal if the feedback signal at the feedback terminal is higher than the reference voltage $V_{R2}$. The output of the comparator 345 is connected to the OR gate 350. The output of the OR gate 350 is connected to the AND gate 351. Anther input of the AND gate 351 is connected to the control signal CNT. The output of the AND gate 351 is connected to the NOR gate 370 to generate the reset signal OFF. The second input of the NOR gate is connected to the output of the AND gate 352. The input of the AND gate 352 is coupled to the control signal CNT via the inverter 360. Another input of the AND gate 352 is connected to the output of the comparator 345. The error signal COM and the ramp signal RAMP are coupled to the comparator 345 to generate the reset signal OFF signal when the control signal CNT is disabled. The third input of the NOR gate is coupled to a power-on reset signal PWRST through the inverter 361.

Figure 12:
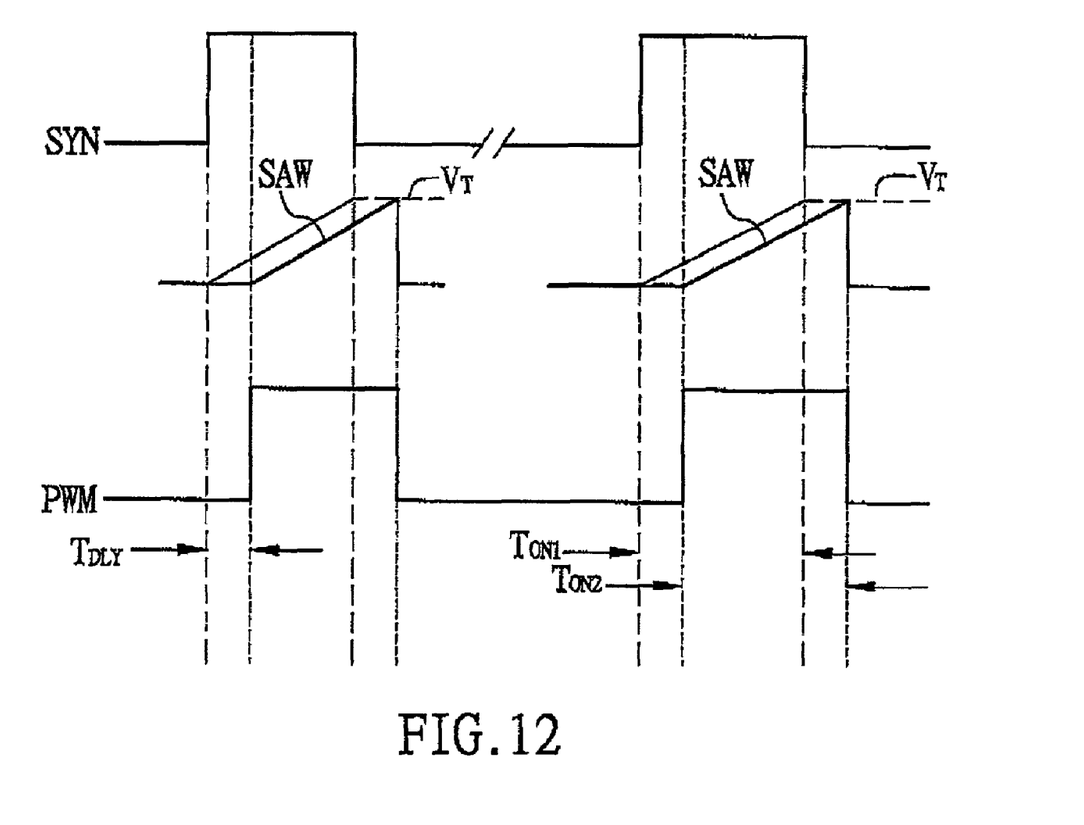
FIG. 12 shows key waveforms of the switching controller shown in FIG. 2.

FIG. 12 shows waveforms of the input signal $S_{YN}$ and the switching signal PWM. The input signal $S_{YN}$ is coupled to generate the switching is signal PWM after the delay time $T_{DLY}$. The first integration signal $V_T$ is generated in accordance with the pulse width $T_{ON1}$ of the input signal $S_{YN}$. Once the switching signal PWM is generated, the second integration signal SAW will be generated accordingly. The switching signal PWM will be disabled once the second integration signal SAW is higher than the first integration signal $V_T$. The pulse width $T_{ON2}$ of the switching signal PWM is thus same as the pulse width $T_{ON1}$ of the input signal $S_{YN}$. The power sharing is therefore achieved for parallel power converters.

Figure 13:
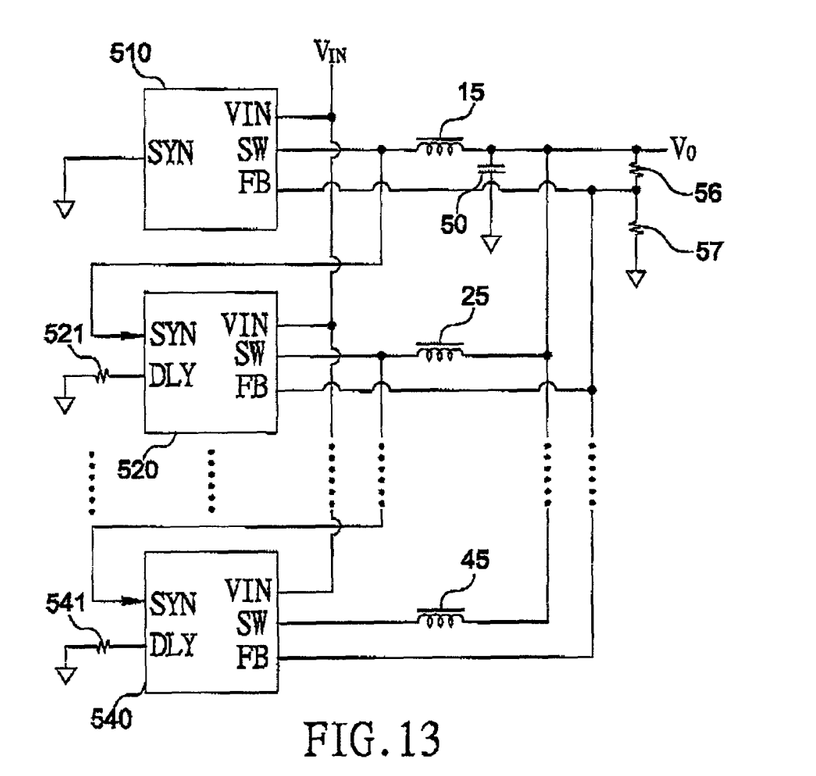
FIG. 13 shows parallel power supplies of a second embodiment according to present invention.

FIG. 13 shows another preferred embodiment of parallel power supplies, in which an delay terminal DLY is utilized to program the delay time $T_{DLY}$. The delay time $T_{DLY}$ can be determined by connecting a resistor from the delay terminal DLY to ground. The resistor such as resistors 521 and 541 are used to program the delay time $T_{DLY}$ for switching controllers 520 and 540 respectively.

Figure 14:
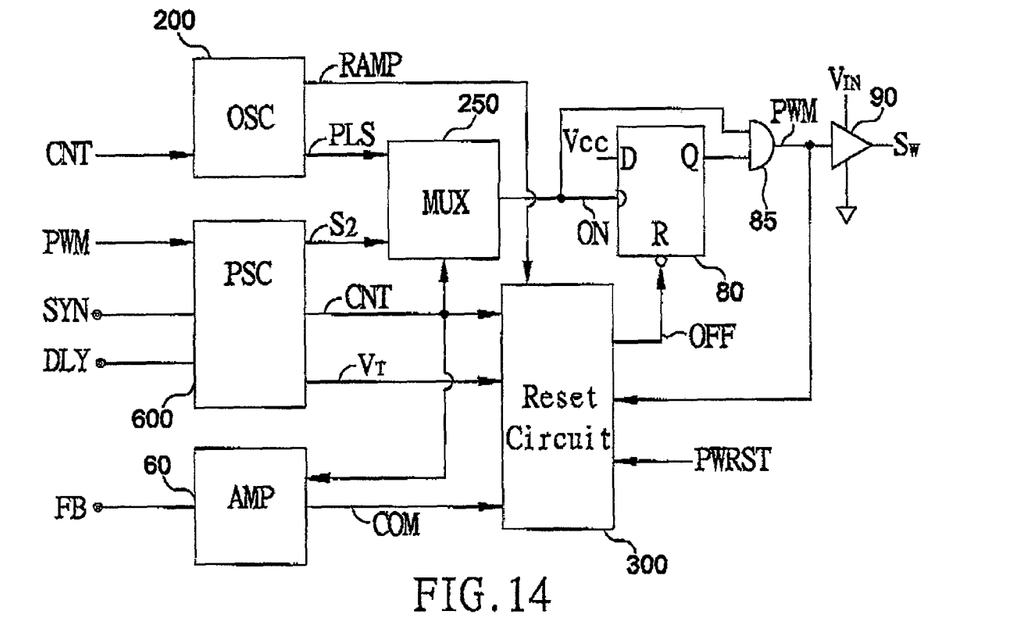
FIG. 14 shows a switching controller of the parallel power supplies shown in FIG. 13.
Figure 15:
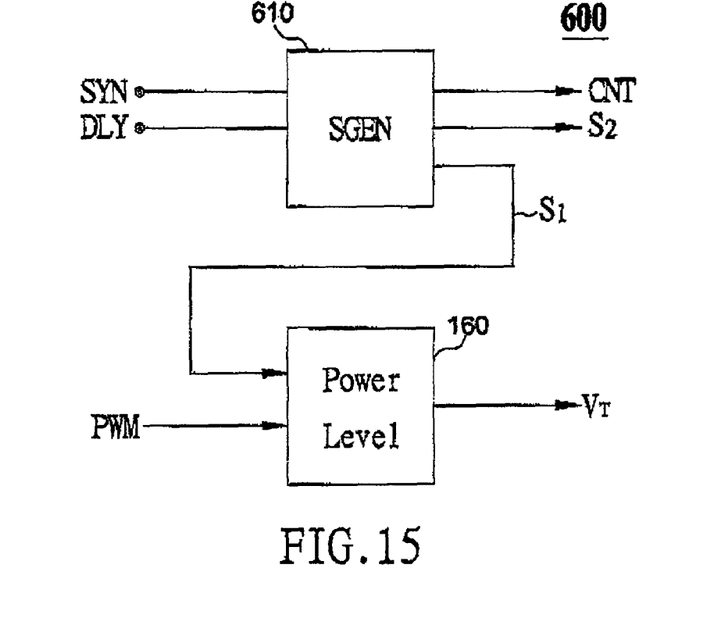
FIG. 15 shows a power sharing circuit of the switching controller shown in FIG. 14.
Figure 16:
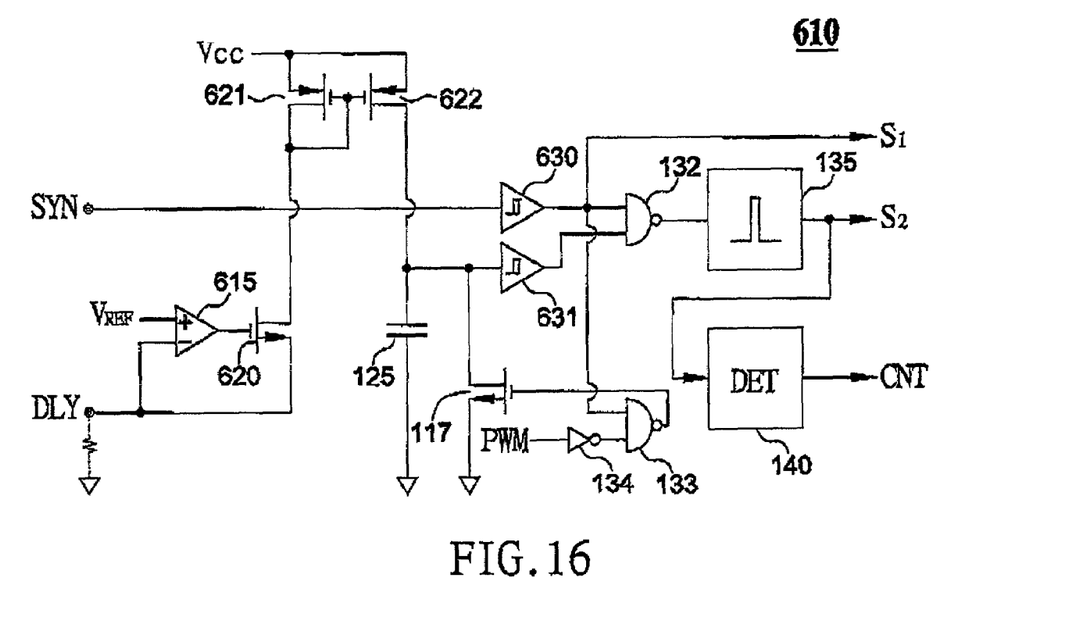
FIG. 16 shows an input circuit of the switching controller shown in FIG. 14.

FIG. 14 shows another preferred embodiment of the switching controller such as 510, 520 and 540. The delay terminal DLY is coupled to a power sharing circuit 600. FIG. 15 shows the power sharing circuit 600. The delay terminal DLY is connected to an input circuit 610. FIG. 16 shows the circuit schematic of the input circuit 610. A buffer gate 630 is connected to the input terminal SYN to receive the input signal $S_{YN}$. The buffer gate 630 generates the input-shaping signal $S_1$ in response to the input signal $S_{YN}$. The input-shaping signal $S_1$ will be enabled (logic-high) when the input signal $S_{YN}$ is higher than the threshold voltage of the buffer gate 630. An operational amplifier 615 having a positive input connected a reference voltage $V_{REF}$. The negative input of the operational amplifier 615 is coupled to the delay terminal DLY. The operational amplifier 615 associates with a transistor 620 generate a current I620 in accordance with the resistance of the resistor such as the resistor 521 or 541. Transistors 621 and 622 form a current mirror to generate a current $I_{622}$ in accordance with the current $I_{620}$. The current $I_{622}$ is connected to charge the capacitor 125. The input of a buffer gate 631 is connected to the capacitor 125. The output of the buffer gate 631 is connected to an input of an NAND gate 132. Another input of the NAND gate 132 is connected to the input-shaping signal $S_1$. The output of the NAND gate 132 is coupled to generate the phase-shift signal $S_2$ through a pulse generator 135. The delay time $T_{DLY}$ is thus existed in between the enable of the input signal $S_{YN}$ and the enable of the phase-shift signal $S_2$. The resistor such as resistor 521 or 541 determines the current $I_{620}$ and the current $I_{622}$. The current $I_{622}$ and the capacitance of the capacitor 125 determine the delay time $T_{DLY}$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:
1. A switching controller for a power supply, the switching controller comprising:
   an input circuit coupled to an input terminal to receive an input signal for generating a phase-shift signal;
   a first integration circuit coupled to the input circuit to generate a first integration signal in response to a pulse width of the input signal;

a control circuit coupled to the first integration circuit to generate a switching signal for switching the power supply;

an oscillator generating a pulse signal and a ramp signal; and an error amplifier coupled to an output of the power supply to generate an error signal wherein if the input signal is not available, the switching signal is enabled in response to the pulse signal and disabled in response to a comparison of the error signal and the ramp signal and wherein the switching signal is enabled in response to the phase-shift signal, and a pulse width of the switching signal is determined in accordance with the first integration signal.

2. The switching controller as claimed in claim 1, wherein the first integration signal is increased in response to an increase of the pulse width of the input signal, and the pulse width of the switching signal is decreased in response to a decrease of the first integration signal.

3. The switching controller as claimed in claim 1 further comprising a resistor to determine a delay time from an enable of the input signal to an enable of the phase-shift signal.

4. The switching controller as claimed in claim 1, wherein the input circuit comprises a detection circuit to detect an input of the input signal.

5. The switching controller as claimed in claim 1, wherein the error amplifier is operated for over-voltage protection once the input signal is available.

6. The switching controller as claimed in claim 1 further comprising a second integration circuit coupled to generate a second integration signal in response to the pulse width of the switching signal, wherein the input circuit further generates a phase-shift signal, and the switching signal is disabled in response to a comparison of the first integration signal and the second integration signal.

7. A switching controller for a power supply, the switching controller comprising:

an input circuit for receiving an input signal and generating a phase-shift signal;

a first integration circuit coupled to the input circuit for integrating the input signal and generating a first integration signal;

a control circuit coupled to the input circuit and enabled by the phase-shift signal to generate a switching signal and disabled by a reset signal;

a second integration circuit coupled to the control circuit for integrating the switching signal and generating a second integration signal;

an oscillator generating a pulse signal and a ramp signal; and an error amplifier coupled to an output of the power supply to generate an error signal wherein if the input signal is not available, the switching signal is enabled in response to the pulse signal and disabled in response to a comparison of the error signal and the ramp signal.

8. The switching controller as claimed in claim 7 further comprising a resistor coupled to the input circuit for determining a delay time in between the input signal and the phase-shift signal.

\* \* \* \* \*